United States Patent [19]

Holmquist et al.

[11] 4,135,122

[45] Jan. 16, 1979

[54] METHOD AND APPARATUS FOR HEATING ELECTRICAL MOTORS AND LIKE DEVICES

[75] Inventors: John R. Holmquist, Federal Way; John E. Sherman, Tacoma, both of Wash.

[73] Assignee: Weyerhaeuser Company, Tacoma, Wash.

[21] Appl. No.: 800,204

[22] Filed: May 25, 1977

[51] Int. Cl.² .............................................. H02P 7/00
[52] U.S. Cl. ..................................... 318/436; 219/209; 219/492; 307/261; 323/18; 307/96; 307/106
[58] Field of Search ................ 318/436; 219/209, 210, 219/492; 307/261, 252 UA, 96, 97, 106, 269; 323/18

[56] References Cited

U.S. PATENT DOCUMENTS

| | | | |
|---|---|---|---|
| 3,307,094 | 2/1967 | Ogle | 307/252 UA |
| 3,582,712 | 6/1971 | Blair | 318/436 |
| 3,717,804 | 4/1972 | Dikinis et al. | 318/436 |
| 3,774,096 | 11/1973 | Hann | 318/436 |

Primary Examiner—Robert K. Schaefer
Assistant Examiner—M. K. Mutter
Attorney, Agent, or Firm—Christensen, O'Connor, Johnson & Kindness

[57] ABSTRACT

A motor heat control circuit is provided for heating an electrical motor during the time of motor shutdown, with the circuit functioning to interconnect a winding of the motor with a source of alternating current voltage for substantially an entire half-cycle of the alternating current voltage but only at intervals comprising a selected plurality of cycles of the alternating current voltage. In its preferred form, the motor heat control circuit is adapted to be connected in shunt circuit with a main motor contactor normally interconnecting the motor winding with the source of alternating current voltage, and includes a controllable semi-conductor switch controlled by digital counting logic which is responsive to clock pulses developed from the alternating current voltage.

38 Claims, 3 Drawing Figures

4,135,122

METHOD AND APPARATUS FOR HEATING ELECTRICAL MOTORS AND LIKE DEVICES

FIELD OF THE INVENTION

This invention generally relates to methods and apparatus for heating electrical motors and like devices and, more particularly, to such methods and apparatus which function to prevent condensation from occurring in the windings of an electrical motor during the time that the motor is shut down, and which more generally function to regulate the amount of heating provided by a coil or winding.

BACKGROUND OF THE INVENTION

Electrical motor heating systems are known to the prior art for heating an electrical motor during the time that the electrical motor is shut down. The purpose of such heating is to minimize or to prevent condensation from occurring in the windings of the electrical motor, which condensation lowers the insulation resistance of the motor windings. If the condensation is not removed prior to the time that the motor is restarted, the lowered insulation resistance will, in most cases, result in damage to or destruction of the motor when the motor windings are re-energized.

Therefore, electrical motors, and particularly those which are located in industrial environments in which ambient temperatures may change rapidly, must be heated during shutdown to prevent substantial condensation from occurring. In the past, a source of heat, such as that provided by an electrical radiant heater, or even a light bulb, has been placed in proximity to the motor during the period of motor shutdown. There is practically no way, however, to insure that such methods will actually prevent condensation from occurring due to the uncertain nature of heat transfer between the source of heat and the motor windings. Motor damage or destruction often occurs upon the restarting of such motors unless a technician is sent out to measure the insulation resistance of the motor windings prior to restarting. As can be appreciated, such methods of heating are also expensive to implement, requiring the services of a trained individual who must connect and disconnect the source of heat and measure the insulation resistance of the motor if necessary.

The prior art has taught a number of methods and apparatus for automatically and more efficiently heating the motor windings upon motor shutdown. As taught in the patent to Crawford, U.S. Pat. No. 2,240,207, the secondary winding of a single-phase transformer, whose primary winding is interconnected with a suitable source of electrical power, is selectively interconnected with two motor winding terminals of a multiphase motor only when the contacts of a main contactor supplying three-phase power to the motor winding are opened.

In the Crawford patent, a relay coil is actuated when auxiliary contacts associated with the main contactor are closed, with the auxiliary contacts being closed only when the main contacts thereof are opened. The contacts of this relay coil complete a circuit between the transformer secondary and the two terminals of the multi-phase motor.

As a result, a small voltage is applied to the motor winding during motor shutdown which results in a single-phase alternating current flowing through the motor winding. The magnitude of the alternating current is chosen to result in a temperature rise in the motor of a few degrees above the ambient temperature.

Although simple in concept and in execution, the method and apparatus taught in the Crawford patent has proved to encounter significant difficulties in practical applications. For example, the transformer and associated relay are cumbersome and generally cannot be placed in an enclosure also containing a starter for the motor. More important, it has been discovered that application of a voltage to a single winding of a multi-phase AC motor will result in a tremendously high current through that winding when the voltage exceeds a predetermined value. In the case of a 575 VAC, three-phase induction motor, a voltage in excess of 28 volts applied to a single-phase winding thereof will result in the current through the winding quickly going to infinity as the iron in the motor is saturated. If this high current is permitted to exist for a predetermined period of time, the winding insulation will fail and the motor winding will burn out. Since the method and apparatus taught in the Crawford patent continuously applies an alternating current to the motor winding upon motor shutdown, it is particularly difficult in practice to select a desired value of the voltage applied to the motor winding which will obtain the desired heating effect and yet not result in a current through the motor winding capable of causing motor burn-out.

Another motor heating system of the prior art is that taught in the patent to Koch, U.S. Pat. No. 2,338,518, in which the secondary of a single-phase transformer is manually switched into circuit with the terminals of the exciting winding of a multi-phase motor in such a manner so as to result in a single-phase alternating current flowing in the same direction through all phases of the exciting winding to achieve motor heating.

Yet another motor heating system of the prior art is that taught in the patents to Blair, U.S. Pat. No. 3,445,743 and U.S. Pat. No. 3,582,712. A circuit is provided for interconnecting the secondary winding of a single-phase transformer with the terminals of a multi-phase motor so as to apply a single-phase alternating current to all phases of the motor winding for motor heating purposes. The circuit in the Blair patents operates to automatically interconnect the transformer secondary with the motor terminals at a predetermined time after the motor is shut down.

As with the method and apparatus taught in the Crawford patent, those in the patents to Koch and Blair are disadvantageous in practical application for the reasons already noted.

A more recent approach in the prior art is that typified by the patents to Dikinis et al., U.S. Pat. No. 3,717,804, and Hann, U.S. Pat. No. 3,774,096. In the Dikinis and Hann patents, a plurality of contact pairs of a motor contactor interconnect a multi-phase power supply with a multi-phase motor. A first conductor shunts a first one of the contact pairs, and a motor heater circuit shunts a second one of the contact pairs. Within the motor heater circuit is located the series connection of current-carrying electrodes of a controlled semiconductor switch, such as an SCR or a TRIAC, and a fuse. Conduction of the controlled semiconductor switch is afforded by a timing circuit including a capacitor and a variable resistor also connected in series across the second one of the contact pairs with the common junction of the capacitor and the resistor being coupled to a gate electrode of the controlled semiconductor switch through a diode and a voltage breakdown device. In operation, the motor heater circuit is shunted by the second one of the contact pairs when the motor is in operation. When the contact pairs are opened, however, the timing circuit within the motor heating circuit functions to apply a gating pulse to the controlled semiconductor switch at a predetermined time during each half-cycle of the applied voltage. In response, the controlled semiconductor switch conducts for the remainder of each half-cycle to provide a current path between the current-carrying electrodes, and therefore through the fuse, the motor winding and the conductor shunting the first one of the contact pairs, so that a short current pulse is applied to the motor winding for a portion of each half-cycle to heat the motor.

The circuits in the Dikinis and Hann patents generate a significant amount of radio frequency interference inasmuch as the controlled semiconductor switches therein are switched on at a time when the applied voltage has a relatively high value.

More importantly, the circuits in the Dikinis and Hann patents are constrained to place the controlled semiconductor switches in a conducting condition during each half-cycle, or, in some cases, during each alternative half-cycle, of the applied voltage wave form. Assuming that a 575 VAC multi-phase power supply is used, it is apparent that the instantaneous voltage applied to the motor winding energized by the circuits in the Dikinis and Hann patents may exceed 28 volts, as previously discussed, during each half-cycle of the applied voltage wave form. Although the time duration of each current pulse provided by the circuits in the Dikinis and Hann patents is not sufficient to result in motor burn-out, the repeated application of such current pulses in successive half-cycles will most certainly result in motor burn-out, unless each pulse is provided for only a very short portion of each half-cycle. But, if the pulse time duration during each half-cycle is reduced to this amount, the requisite motor heating effect is often not obtained.

Finally, the use of R-C timing circuits in the Dikinis and Hann patents (to determine the amount of delayed conduction or "phase-control" therein) provides a disadvantage inasmuch as the time constants of such R-C circuits will change over an extended period of time. Therefore, the circuits in the Dikinis and Hann patents require, in actual application, continued re-examination by skilled personnel in which the amount of phase-control being provided is monitored and corrected if necessary. If such correction is not provided, then there is a possibility that the circuits in the Dikinis and Hann patents will apply longer current pulses than those initially applied to the motor winding, with a consequent probability of motor burn-out.

It will also be apparent to those skilled in the art that the aforementioned problems of using a motor winding to heat an electrical motor are also found in more generalized situations in which a coil is used in an induction heater. For example, it is oftentimes difficult in such situations to obtain a desired heating effect from the induction heater without also risking unduly high current flows through the coil of the induction heater and a consequent probability of coil failure.

It is therefore an object of this invention to provide an apparatus for heating an electrical motor during motor shutdown which is reliable in operation, even when left unattended for long periods of time.

It is a further object of this invention to provide such an apparatus which does not require the attention of skilled personnel at the time of installation, or at any subsequent time during motor shutdown, or when the motor is restarted.

It is yet a further object of this invention to provide such an apparatus which is simple and inexpensive to construct.

It is another object of this invention to provide such an apparatus which utilizes solid-state elements and which therefore can be packaged so as to be installed in an enclosure also containing a starter for the electrical motor.

It is yet another object of this invention to provide a method and apparatus for heating an electrical motor during shutdown which generates little or no radio frequency interference during operation.

It is still another object of this invention to provide a method and apparatus which achieves a maximum heating effect without the probability of coil or winding burn-out.

SUMMARY OF THE INVENTION

These objects and others that will be realized from a consideration of the following portion of the specification are achieved, briefly, by a method for heating using a coil which is adapted to be energized by a source of electrical power providing an alternating current voltage, with the method comprising the step of applying substantially an entire half-cycle of the alternating current voltage across the coil at intervals determined by a plurality of cycles of the alternating current voltage.

In one form, such a method may be embodied in a motor heating apparatus for use with an electrical motor, the electrical motor including a motor winding including first and second terminals, and for use with a power source having first and second terminals across which appears an alternating current voltage. The motor heating apparatus comprises first and second inputs adapted to be respectively coupled to the first and second terminals of the power source, and first and second outputs respectively adapted to be coupled to the first and second terminals of the motor winding. First means provide an electrical conducting path between the first input and the first output. Second means provide an electrical conducting path between the second input and the second output for substantially an entire half-cycle of the alternating current voltage at predetermined intervals comprising a selected plurality of cycles of the alternating current voltage.

BRIEF DESCRIPTION OF THE DRAWINGS

The invention can perhaps best be understood by reference to the following portion of the specification, taken in conjunction with the accompanying drawings, in which.

DESCRIPTION OF A PREFERRED EMBODIMENT

Figure 1:
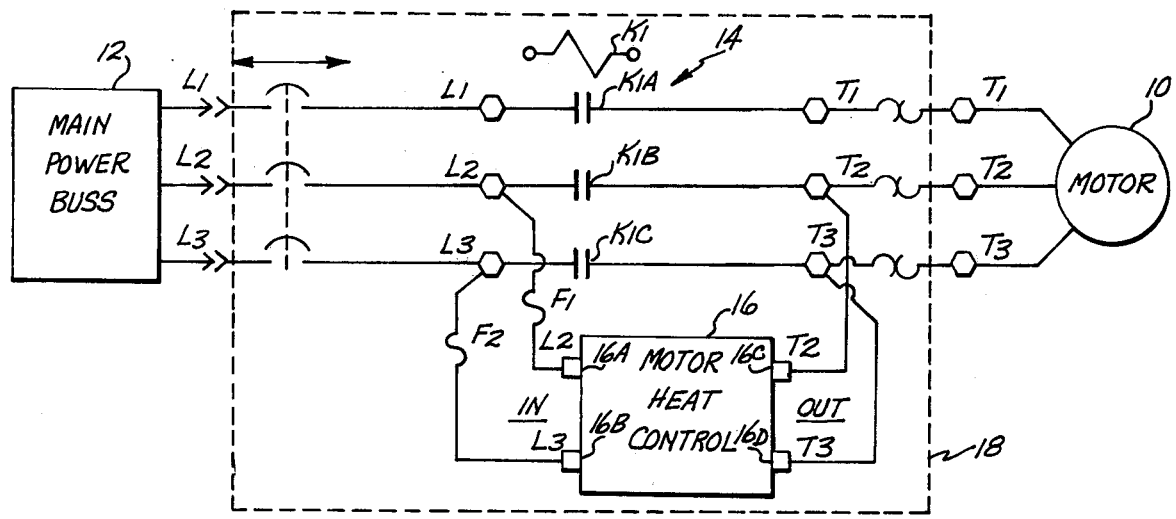
FIG. 1 is a block diagram illustrating how the motor heat control circuit of the present invention is interconnected with an electrical motor to be heated thereby.

Referring to FIG. 1, a three-phase AC induction motor 10 has a plurality of input terminal leads $T_1$, $T_2$ and $T_3$ for the motor winding therein. The terminal leads $T_1$, $T_2$ and $T_3$ are connected to respective leads $L_1$, $L_2$ and $L_3$ of a main power bus 12 by a three-phase combination starter 14 of a type well-known to the art. Bus 12 in turn is interconnected with a source of three-phase power, not illustrated. Starter 14 includes a main contactor having a relay coil $K_1$ and associated normally-open contacts $K_{1A}$, $K_{1B}$, and $K_{1C}$. When motor 10 is in a running condition, the relay coil $K_1$ of the main contactor is energized, by means not illustrated, thereby resulting in contacts $K_{1A}$ closing and interconnecting leads $L_1$ and $T_1$, contacts $K_{1B}$ closing and interconnecting leads $L_2$ and $T_2$, and contacts $K_{1C}$ closing and interconnecting leads $L_3$ and $T_3$. As a result, three-phase power is applied to the motor winding of motor 10 from main power bus 12. When motor 10 is in a stopped or shutdown condition, the relay coil $K_1$ of the main contactor is de-energized so that contacts $K_{1A}$, $K_{1B}$, $K_{1C}$ are opened to respectively disconnect leads $L_1$-$T_1$, $L_2$-$T_2$, and $L_3$-$T_3$.

The present invention is embodied in a motor heat control circuit 16 having a pair of inputs 16A, 16B, with input 16A being coupled to lead $L_2$ through a first fuse $F_1$ and with input 16B being coupled to lead $L_3$ through a second fuse $F_2$. The motor heat control circuit 16 also has a pair of outputs 16C, 16D which are respectively connected to motor input terminal leads $T_2$, $T_3$. The motor heat control circuit 16 is preferably packaged so as to be installed along with the starter 14 within a modular enclosure 18 associated with the motor 10.

As will be apparent from consideration of the detailed description of the preferred embodiment illustrated in FIG. 2 hereinafter, motor heat control circuit 16 functions to provide a conducting path between input 16A and output 16C, and therefore to interconnect leads $L_2$ and $T_2$ via fuse $F_1$, at all times. Further, motor heat control circuit 16 functions to provide a conducting path between input 16B and output 16D for substantially an entire half-cycle of the single-phase voltage appearing across leads $L_2$ and $L_3$, but to provide such a conducting path only at predetermined intervals comprising a selected number of cycles of the voltage appearing across leads $L_2$ and $L_3$. As a result, a single-phase, unidirectional current pulse flows through the portion of the winding of motor 10 coupled to input terminals $T_2$ and $T_3$ for the entirety of the half-cycle of the applied voltage, with such current pulse being spaced in time from a preceding current pulse by a selected plurality of cycles of the applied voltage.

Motor heat control circuit 16 functions to provide the aforementioned conducting paths even when the relay coil $K_1$ of the starter 14 is energized and the motor 10 is running. However, in this case, the contacts $K_{1B}$ and $K_{1C}$ respectively shunt the input 16A and output 16C, and the input 16B and output 16D, so that the motor heat control circuit 16 has no effect upon the running of the motor 10.

Figure 2:
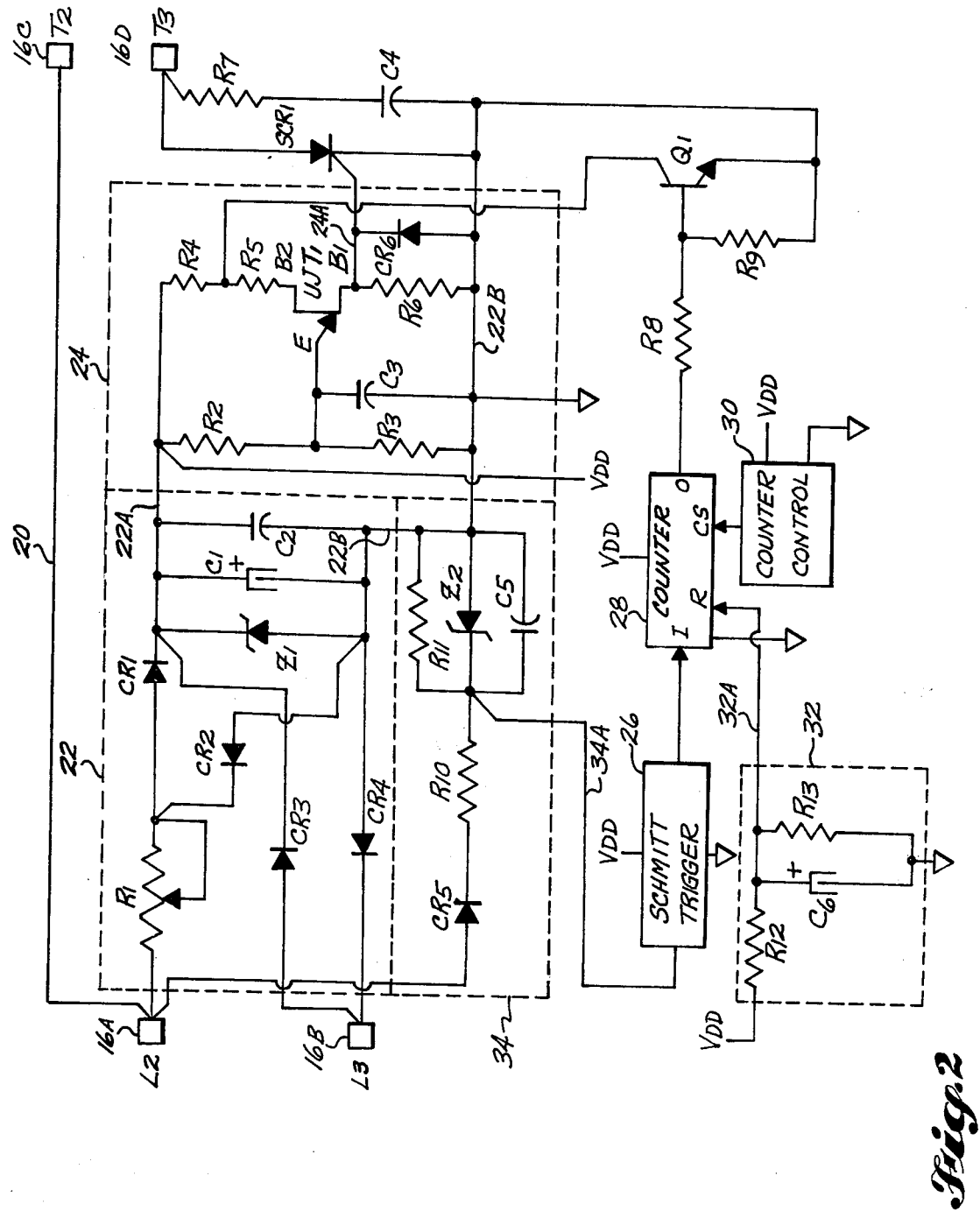
FIG. 2 is a schematic diagram of a preferred embodiment of the motor heat control circuit.

Now turning to FIG. 2, the input 16A and the output 16C are interconnected by a lead 20. Inputs 16A and 16B are connected to respective inputs of a power supply circuit 22. Specifically, input 16A is connected to one side of a variable resistor $R_1$ whose other side is connected to the common junction of the anode of a diode $CR_1$ and the cathode of a diode $CR_2$. Input 16B is connected to the common junction of the anode of a diode $CR_3$ and the cathode of a diode $CR_4$. The cathode of diode $CR_1$ and the cathode of diode $CR_3$ are interconnected, as are the anode of diode $CR_2$ and the anode of diode $CR_4$. A zener diode $Z_1$, a capacitor $C_1$, and a capacitor $C_2$ are connected in parallel between the common junction of diodes $CR_1$ and $CR_3$, and the common junction of diodes $CR_2$ and $CR_4$, which common junctions are respectively connected to output leads 22A, 22B for the power supply circuit 22.

In operation, resistor $R_1$ functions to drop the value of the voltage appearing across leads $L_2$, $L_3$ to a value suitable for the remaining components of the motor heat control circuit 16. Diode $CR_1$-$CR_4$ form a full-wave bridge which rectifies both half-cycles of the applied voltage to provide a unidirectional voltage whose positive magnitude is clamped by zener diode $Z_1$ at a value established by the zener breakdown voltage thereof, and which is filtered by capacitor $C_1$ to provide a DC voltage across output leads 22A, 22B, with output lead 22A being at a positive potential $V_{dd}$ and with output lead 22B being at a reference potential. Capacitor $C_2$ functions to filter high frequency and transient voltages appearing in the applied voltage.

The potential $V_{dd}$ and reference potential thus appearing on output leads 22A, 22B are applied to respective voltage supply inputs of an SCR trigger circuit 24, a Schmitt trigger circuit 26, a counter 28, a counter control circuit 30, and a counter reset circuit 32, all of which will be hereinafter described.

The input 16A is also connected to an input of a clock circuit 34 which is also supplied with the reference potential appearing on output lead 22B of power supply circuit 22. Specifically, counter circuit 34 includes a diode $CR_5$ whose anode is connected to input 16A and whose cathode is connected to one side of resistor $R_{10}$ whose other side is connected to an output lead 34A for the clock circuit 34. A resistor $R_{11}$, a zener diode $Z_2$, and a capacitor $C_5$ are connected in parallel between output lead 34A and output lead 22B of power supply circuit 22.

In operation, diode $CR_5$ half-wave rectifies the voltage appearing across leads $L_2$, $L_3$. The thus-rectified voltage is reduced in value by the voltage drop across resistor $R_{10}$, and the positive excursions of this rectified voltage above reference potential are clamped at a predetermined value as established by the zener breakdown voltage of zener diode $Z_2$, with capacitor $C_5$ delaying the voltage build-up across zener diode $Z_2$ and with resistor $R_{11}$ functioning to provide a discharge path for capacitor $C_5$ on alternate half-cycles of the applied voltage. As a result, output lead 34A has appearing thereon a series of substantially squared, unidirectional pulses occurring once each positive half-cycle of the applied voltage and in synchronism therewith. These pulses are applied to the Schmitt trigger circuit which provides a fast-rising output pulse when the magnitude of each clock pulse exceeds a predetermined threshold. The output pulses of Schmitt trigger circuit 26 are applied to a clock input I of counter 28 which comprises a conventional multi-stage counter operative to provide a pulse on its output once every preselected number of pulses applied to its clock input I. This preselected number is established by an output signal from counter control circuit 30 applied to a count select input CS of counter 28. In practice, counter 28 may comprise a type 4059 counter available from RCA Corporation, which counter has a predetermined number of count select terminals CS, the appearance of a signal on any one of which establishes a preselected count within the counter, and counter control circuit 30 may comprise a plurality of switches and associated resistors manually controllable to apply a voltage obtained from the supply potential $V_{dd}$ and reference potential to one of the count select inputs CS of the counter 2B.

To insure that the counter 28 is reset to its initial state when voltage is first applied to the motor heat control circuit 16, the supply potential $V_{dd}$ and reference potential are coupled to the counter reset control circuit 32 which functions to provide a reset signal on an output load 32A to a reset input R of counter 28 at a predetermined time after the application of the supply potential $V_{dd}$ and reference potential to counter reset control circuit 32. In particular, counter reset control circuit 32 includes a resistor $R_{12}$ in series with a capacitor $C_6$ across the supply potential $V_{dd}$ and reference potential, and resistor $R_{13}$ connected in parallel with capacitor $C_6$, with the common junction of resistor $R_{12}$, and capacitor $C_6$ and resistor $R_{13}$ being connected to the output lead 32A.

The output pulse from counter 28, which occurs in synchronism with one of the input pulses thereto, is coupled through a resistor $R_8$ to the gate electrode of a transistor $Q_1$ (which in practice may comprise a Darlington-connected transistor pair). A resistor $R_9$ interconnects the base and emitter of transistor $Q_1$ to provide base holding current to transistor $Q_1$. The emitter of transistor $Q_1$ is connected to the output lead 22B upon which reference potential appears, and the collector electrode of transistor $Q_1$ is connected to the common junction of a resistor $R_4$ and a resistor $R_5$ forming part of the SCR trigger circuit 24.

In operation, transistor $Q_1$ is normally nonconducting and is placed in a conducting condition for the duration of each output pulse from counter 28.

The SCR trigger circuit 24 includes the series connection of a resistor $R_2$ and a resistor $R_3$ across output leads 22A, 22B. A capacitor $C_3$ is connected in parallel with resistor $R_3$, and the common junction of resistor $R_2$, resistor $R_3$ and capacitor $C_3$ is connected to the emitter electrode E of a unijunction transistor $UJT_1$. One side of resistor $R_4$ is connected to output lead 22A, and one side of resistor $R_5$ is connected to a second base electrode $B_2$ of unijunction transistor $UJT_1$. A resistor $R_6$ connects a first base electrode $B_1$ of unijunction transistor $UJT_1$ to output lead 22B, with the cathode of a diode $CR_6$ being coupled to the common junction of resistor $R_6$ and first base electrode $B_1$ and the anode of diode $CR_6$ being coupled to output lead 22B. The common junction of first base electrode $B_1$, resistor $R_6$ and diode $CR_6$ is connected by a lead 24A to the gate electrode of a silicon controlled rectifier $SCR_1$ whose cathode is connected to output lead 22B and whose anode is connected to the output 16D.

In operation, resistors $R_2$ and $R_3$ form a voltage divider for the voltage appearing across output leads 22A, 22B and accordingly function to charge capacitor $C_3$ over a certain period of time so that a predetermined potential is present on the emitter electrode E of unijunction transistor $UJT_1$. Resistors $R_4$, $R_5$ and $R_6$ also form a voltage divider for the voltage appearing across output leads 22A, 22B. The values of resistors $R_4$, $R_5$ and $R_6$ are chosen so as to establish a predetermined voltage across the second and first base electrodes $B_2$, $B_1$ of unijunction transistor $UJT_1$ which in turn establishes the value of a threshold potential applied to the emitter electrode E that is necessary to cause unijunction transistor $UJT_1$ to provide a conducting path between the emitter electrode E and the first base electrode $B_1$. When transistor $Q_1$ is in a nonconducting condition, this threshold potential is greater than that applied to the emitter electrode E by capacitor $C_3$ and accordingly unijunction transistor $UJT_1$ does not conduct. However, when transistor $Q_1$ is placed in a conducting condition in response to the output pulse from counter 28, this threshold potential is lowered below the value of the potential applied to the emitter electrode E by capacitor $C_3$ so that unijunction transistor $UJT_1$ conducts and provides a conducting path between the emitter electrode E and the first base electrode $B_1$. As a result, capacitor $C_3$ discharges into the gate electrode of the silicon controlled rectifier $SCR_1$ through unijunction transistor $UJT_1$ and lead 24A, and the silicon controlled rectifier $SCR_1$ therefore is placed in a conducting condition very quickly to provide a conducting path between its cathode and anode. When the silicon controlled rectifier $SCR_1$ conducts, a conducting path is established between input 16B and output 16D via diode $CR_4$, lead 22B, and silicon controlled rectifier $SCR_1$. A resistor $R_7$ and capacitor $C_4$ are connected in series across the silicon controlled rectifier $SCR_1$ to prevent false triggering of the silicon controlled rectifier $SCR_1$ in response to transient signals appearing across input 16B and output 16D.

When silicon controlled rectifier $SCR_1$ is placed in a conducting condition, it remains in the conducting condition until the polarity of the voltage appearing across leads $L_2$ and $L_3$, and therefore across input 16B and output 16D, reverses.

To review the operation of the motor heat control circuit 16, the application of a voltage across inputs 16A and 16B results in the supply potential $V_{dd}$ and reference potential being generated by the power supply circuit 22 and applied to the SCR trigger circuit 24, the Schmitt trigger circuit 26, the counter 28, the counter control circuit 30, and the counter reset control circuit 32. Within a very short time, the counter reset control circuit 32 provides an output signal on lead 32A to reset the counter 28. A clock pulse is provided on lead 34A coincident with the first positive half-cycle of the voltage appearing across input 16A, 16B, which clock pulse is squared in Schmitt trigger 26 and is supplied to counter 28 to step counter 28. Counter 28, however, provides no output, inasmuch as the preselected count established by counter control circuit 30 has not yet been reached. Also at this time, capacitor $C_3$ begins charging, but unijunction transistor $UJT_1$ is maintained in a nonconducting condition since transistor $Q_1$ is nonconducting. Therefore, the silicon controlled rectifier $SCR_1$ remains nonconducting.

For successive cycles of the applied voltage appearing across inputs 16A, 16B, counter 28 continues to be stepped by the clock pulses provided by clock circuit 34A through Schmitt trigger 26. During these successive cycles, unijunction transistor $UJT_1$, and thus silicon controlled rectifier $SCR_1$, remain nonconducting. After a predetermined number of such cycles have occurred, counter 28 has been stepped to a point where it will provide an output pulse upon the application of the next clock pulse thereto. During the next cycle, the clock pulse causes counter 28 to provide an output pulse which accordingly places transistor $Q_1$ in a conducting condition, whereby unijunction transistor $UJT_1$ is also placed in a conducting condition to discharge capacitor C₃ into the gate electrode of SCR₁, thereby placing SCR₁ in a conducting condition. The short signal processing times of the motor heat control circuit 16 insure that SCR₁ is placed in a conducting condition substantially simultaneously with, but slightly delayed from, the occurrence of the zero crossing of the half-cycle representing the preselected number established by counter control circuit 30. Accordingly, the silicon controlled rectifier SCR₁ completes the conducting path between input 16B and output 16D substantially at the beginning of this half-cycle and continues that conducting path until the termination of the half-cycle.

It will therefore be appreciated that a undirectional current is supplied to the winding of the motor 10 for substantially an entire half-cycle of the applied voltage. When counter 28 provides its output pulse, it is internally reset and thereafter will not provide another output pulse until the occurrence of the preselected number of cycles established by counter control circuit 30. Therefore, upon the alternate half-cycle of the applied voltage succeeding the half-cycle of conduction, transistor Q₁ is maintained in a nonconducting condition and, as a result, unijunction transistor UJT₁ and silicon controlled rectifier SCR₁ are also nonconducting.

It should be noted that motor heat control circuit 16 operates in this manner at all times, including the times when the winding of motor 10 is interconnected with the main power bus 12 via contacts $K_{1A}$, $K_{1B}$, and $K_{1C}$ and the motor 10 is running. However, the motor heat control circuit has no effect when the motor 10 is running inasmuch as the conducting path in motor heat control circuit 16 between input 16B and output 16D is shunted by contacts $K_{1C}$.

Figure 3:
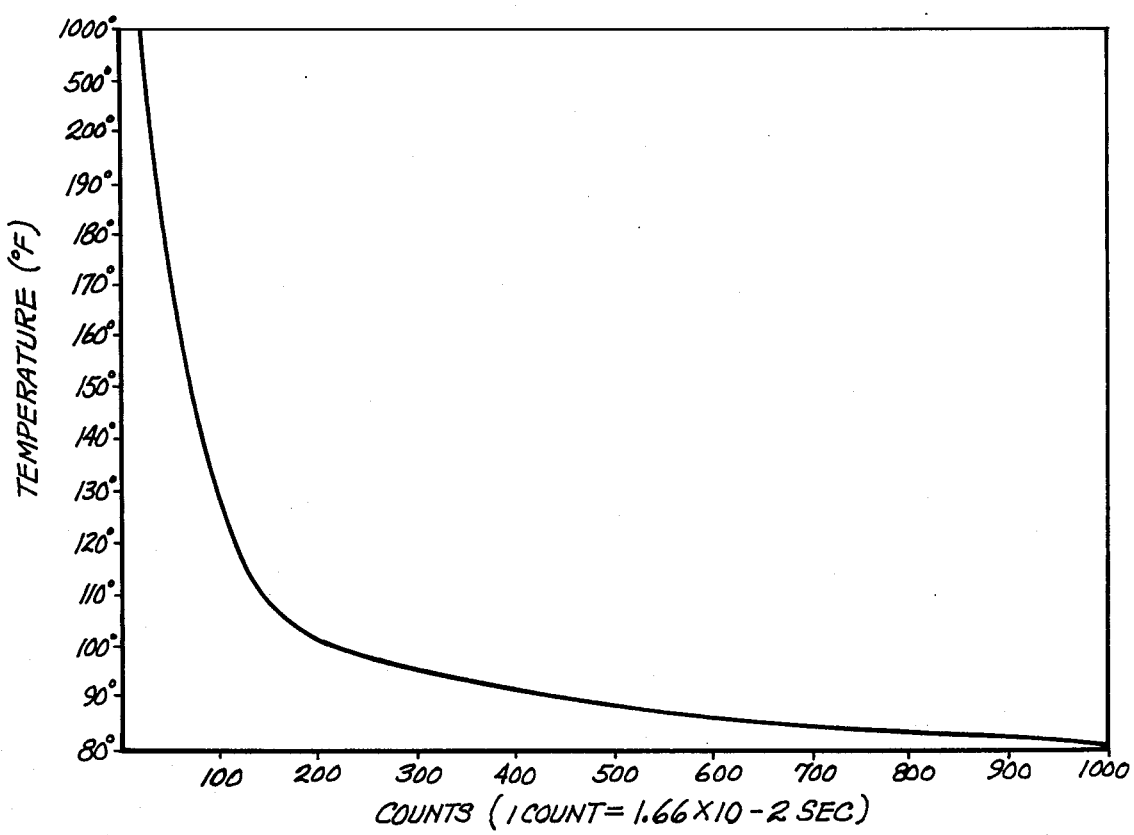
FIG. 3 is a graph illustrating the motor heating effect produced by use of the motor heat control circuit of the present invention.

The effect of the motor heat control circuit 16 in heating the motor 10 can be seen from a consideration of FIG. 3, which represents calculated data obtained from a test run on a 440 VAC induction motor under ambient temperature conditions of 80° F. and utilizing the motor heat control circuit 16 of the present invention. At the far right hand side of FIG. 3, it will be seen that where the counter control circuit 30 is set to control counter 28 to provide an output pulse once every 1,000 clock pulses thereto (where each clock pulse occurs at the inverse of the line frequency, i.e., 1.66 times $10^{-2}$ second), a very slight rise in motor temperature is obtained. Proceeding to the left in FIG. 3, as the counter interval decreases, it will be noticed that a gradually increasing amount of motor heating is obtained. For example, at counter intervals of 300 clock pulses, the motor temperature is elevated to approximately 95° F. As the counter interval is further decreased, it will be recognized that a point is reached at which the motor temperature rises quite rapidly. For example, for intervals below 100 clock pulses, the motor temperature rapidly rises to 1000° F. As previously discussed, this rapid rise in motor temperature is a result of saturation of the iron associated with the motor winding, resulting in a tremendously large flow of current through the motor winding which, if not checked, will result in breakdown of the motor insulation and consequent motor burn-out. Therefore, there is a minimum counter interval which must be determined by the specific motor with which the motor heat control circuit is used. However, the present invention is notable in that the amount of heating for intervals above this minimum interval can be precisely controlled by adjusting the counter control circuit 30 to select any desired count interval, resulting in a precisely controllable temperature rise up to approximately 20° F. above ambient temperature.

The motor heat control circuit 16 of the present invention is also extremely stable in its operation, in that the time of current pulse application is in no way determined by R-C time constant circuits, but rather upon the use of simple digital counting logic providing predictable and repeatable current pulse control. Moreover, the motor heat control circuit 16 can be installed by practically any unskilled person, if the circuitry is designed so as to not permit a count interval which would result in an excessive temperature rise in the motor. Finally, the motor heat control circuit 16 of the present invention generates very little radio frequency interference, inasmuch as the silicon controlled rectifier SCR₁ is turned on substantially simultaneously with the onset of a half-cycle of the applied voltage at which time the voltage value is at a very small value so that a small amount of current initially flows through the motor winding.

While the invention has been described with reference to a preferred embodiment, it is to be clearly understood by those skilled in the art that the invention is not limited thereto, but rather that the scope of the invention is to be interpreted only in conjunction with the appended claims. For example, the motor heat control circuit 16 may be also used in conjunction with a coil to thereby provide controllable induction heating in applications other than the heating of an electrical motor.

What is claimed is:

1. A motor heating apparatus for use with an electrical motor which includes a motor winding having first and second terminals, and a power source having first and second terminals across which appears an alternating current voltage, said motor heating apparatus comprising:
    (a) first and second inputs adapted to be respectively coupled to the first and second terminals of the power source, and first and second outputs adapted to be respectively coupled to the first and second terminals of the motor winding;
    (b) first means providing an electrical conducting path between said first input and said first output; and
    (c) second means providing an electrical conducting path between said second input and said second output for substantially an entire half-cycle of said alternating current voltage at predetermined intervals each substantially equal in duration to a selected plurality of cycles of said alternating current voltage.

2. An apparatus as recited in claim 1, wherein said second means includes:
    (a) controllable semiconductor switch means having a pair of current-carrying terminals, and a gating terminal, and operative to provide a unidirectional current conducting path between said pair of current-carrying terminals upon the application of a gating pulse to said gating terminal;
    (b) means interconnecting said current-carrying terminals of said controllable semiconductor switch means in series circuit with said second input and said second output;
    (c) clock means coupled to said first input and said second input for providing a plurality of clock pulses occurring in synchronism with said alternating current voltage;

(d) counter means responsive to said clock pulses for providing an output pulse substantially simultaneously with the initiation of a half-cycle of said alternating current voltage once every predetermined plurality of said clock pulses; and, (e) trigger circuit means responsive to each said output pulse to provide said gating pulse to said gating terminal of said controllable semiconductor switch means.

3. An apparatus as recited in claim 2, wherein said controllable semiconductor switch means is a silicon controlled rectifier.

4. An apparatus as recited in claim 2, wherein said clock means includes means for rectifying said alternating current voltage to provide unidirectional pulses substantially simultaneously with alternate half-cycles of said alternating current voltage, and means for squaring said unidirectional pulses to provide said clock pulses.

5. An apparatus as recited in claim 2, further comprising power supply means having a pair of inputs coupled to said first and second inputs of said apparatus, and a pair of outputs, said power supply means being operative to provide a unidirectional power supply voltage across said pair of outputs from said alternating current voltage, and means for coupling said unidirectional power supply voltage to said counter means and to said trigger circuit means.

6. An apparatus as recited in claim 5, wherein said power supply means comprises means for rectifying said alternating current voltage to provide a unidirectional voltage, and means for regulating the magnitude of said unidirectional voltage at a predetermined value to provide said undirectional power supply voltage.

7. An apparatus as recited in claim 5, wherein said trigger circuit means includes:

(a) a unijunction transistor having first and second base electrodes and an emitter electrode, said unijunction transistor being operative to provide a conducting path between said emitter electrode and said first base electrode when a potential applied to said emitter electrode exceeds a predetermined threshold potential established by a voltage across said first and second base electrodes;

(b) energy storage means coupled to said emitter electrode;

(c) means for charging said energy storage means from said unidirectional power supply voltage to develop on said emitter electrode a predetermined potential;

(d) means coupling said first and said second base electrodes to said unidirectional power supply voltage so as to provide a voltage across said first and second base electrodes which establishes a threshold potential at said emitter electrode greater than said predetermined potential;

(e) means responsive to each output pulse from said counter means for lowering the voltage across said first and second base electrodes so as to establish a threshold potential which is lower than said predetermined potential; and (f) means coupling said first base electrode to said gate terminal of said controllable semiconductor switch means.

8. An apparatus as recited in claim 2, further comprising counter control means for adjusting said predetermined plurality of clock pulses for which said counter means provides said output pulse.

9. An apparatus for use with an electrical motor having a motor winding, a source of electrical power providing an alternating current voltage, and contactor means for interconnecting the motor with the source to apply the alternating current voltage to the motor winding when the motor is to be run, and for disconnecting the motor from the source when the motor is to be shut down, said apparatus being operative to heat the electrical motor when the motor is shut down and comprising motor heat control circuit means for applying to the motor winding a plurality of unidirectional current pulses, each of said unidirectional current pulses persisting for substantially an entire half-cycle of the alternating current voltage, said unidirectional current pulses occurring at intervals each substantially equal in duration to a selected plurality of cycles of the alternating current voltage.

10. An apparatus as recited in claim 9, wherein the electrical motor comprises a multi-phase motor having a plurality of motor windings, wherein the source of electrical power provides a multi-phase alternating current voltage, and wherein said motor heat control circuit means of said apparatus is operative to apply said plurality of unidirectional current pulses to one of the plurality of motor windings upon motor shut down.

11. An apparatus as recited in claim 9, wherein said apparatus further comprises means for adjusting said intervals at which said unidirectional current pulses occur.

12. A method for heating an electrical motor having a motor winding which is adapted to be energized by a source of electrical power providing an alternating current voltage, said method comprising the step of applying a plurality of unidirectional current pulses to the motor winding, each said unidirectional current pulse having a duration substantially equal to an entire half-cycle of the alternating current voltage, with each said unidirectional current pulse being spaced in time from a preceding one of said plurality of unidirectional current pulses by a predetermined interval substantially equal in duration to a selected plurality of cycles of the alternating current voltage.

13. A method for heating an electrical motor having a motor winding from a source of electrical power providing an alternating current voltage, said method comprising the step of applying substantially an entire half-cycle of the alternating current voltage across the motor winding at intervals determined by a plurality of cycles of the alternating current voltage.

14. A method for heating a multi-phase electrical motor having a motor winding with a plurality of phases, from a source of electrical power providing a multi-phase alternating current voltage, said method comprising the step of developing a single-phase alternating current voltage from the multi-phase alternating current voltage, and applying substantially an entire half-cycle of said single-phase alternating current voltage to a single phase of the motor winding at intervals determined by a plurality of cycles of said single-phase alternating current voltage.

15. A method for heating using a coil which is adapted to be energized by a source of electrical power providing an alternating current voltage, said method comprising the step of applying substantially an entire half-cycle of the alternating current voltage across the coil at intervals determined by a plurality of cycles of the alternating current voltage.

16. A method for heating using a coil which is adapted to be energized by a source of electrical power providing an alternating current voltage, said method comprising the step of applying a plurality of unidirectional current pulses to the coil, each said unidirectional current pulse having a duration substantially equal to an entire half-cycle of the alternating current voltage, with each said unidirectional current pulse being spaced in time from a preceding one of said plurality of unidirectional current pulses by a predetermined interval substantially equal in duration to a selected plurality of cycles of the alternating current voltage.

17. An apparatus for heating using a coil having first and second terminals, and a power source having first and second terminals across which appears an alternating current voltage, said apparatus comprising:
    (a) first and second inputs adapted to be respectively coupled to the first and second terminals of the power source, and first and second outputs adapted to be respectively coupled to the first and second terminals of the coil;
    (b) first means providing an electrical conducting path between said first input and said first output; and
    (c) second means providing an electrical conducting path between said second input and said second output for substantially an entire half-cycle of said alternating current voltage at predetermined intervals each substantially equal in duration to a selected plurality of cycles of said alternating current voltage.

18. An apparatus as recited in claim 17, wherein said second means includes:
    (a) controllable semiconductor switch means having a pair of current-carrying terminals, and a gating terminal, and operative to provide a unidirectional current conducting path between said pair of current-carrying terminals upon the application of a gating pulse to said gating terminal;
    (b) means interconnecting said current-carrying terminals of said controllable semiconductor switch means in series circuit with said second input and said second output;
    (c) clock means coupled to said first input and said second input for providing a plurality of clock pulses occurring in synchronism with said alternating current voltage;
    (d) counter means responsive to said clock pulses for providing an output pulse substantially simultaneously with the initiation of a half-cycle of said alternating current voltage once every predetermined plurality of said clock pulses; and,
    (e) trigger circuit means responsive to each said output pulse to provide said gating pulse to said gating terminal of said controllable semiconductor switch means.

19. An apparatus recited in claim 18, wherein said controllable semiconductor switch means is a silicon controlled rectifier.

20. An apparatus as recited in claim 18, wherein said clock means includes means for rectifying said alternating current voltage to provide unidirectional pulses substantially simultaneously with alternate half-cycles of said alternating current voltage, and means for squaring said unidirectional pulses to provide said clock pulses.

21. An apparatus as recited in claim 18, further comprising power supply means having a pair of inputs coupled to said first and second inputs of said apparatus, and a pair of outputs, said power supply means being operative to provide a unidirectional power supply voltage across said pair of outputs from said alternating current voltage, and means for coupling said unidirectional power supply voltage to said counter means and to said trigger circuit means.

22. An apparatus as recited in claim 21, wherein said power supply means comprises means for rectifying said alternating current voltage to provide a unidirectional voltage, and means for regulating the magnitude of said unidirectional voltage at a predetermined value to provide said unidirectional power supply voltage.

23. An apparatus as recited in claim 21, wherein said trigger circuit means includes:
    (a) a unijunction transistor having first and second base electrodes and an emitter electrode, said unijunction transistor being operative to provide a conducting path between said emitter electrode and said first base electrode when a potential applied to said emitter electrode exceeds a predetermined threshold potential established by a voltage across said first and second base electrodes;
    (b) energy storage means coupled to said emitter electrode;
    (c) means for charging said energy storage means from said unidirectional power supply voltage to develop on said emitter electrode a predetermined potential;
    (d) means coupling said first and said second base electrodes to said unidirectional power supply voltage so as to provide a voltage across said first and second base electrodes which establishes a threshold potential at said emitter electrode greater than said predetermined potential;
    (e) means responsive to each output pulse from said counter means for lowering the voltage across said first and second base electrodes so as to establish a threshold potential which is lower than said predetermined potential; and
    (f) means coupling said first base electrode to said gate terminal of said controllable semiconductor switch means.

24. An apparatus as recited in claim 18, further comprising counter control means for adjusting said predetermined plurality of clock pulses for which said counter means provides said output pulse.

25. A control circuit for interconnection between a load circuit having first and second terminals and a source of alternating current wherein said first terminal of said load circuit is electrically connected to said source of alternating current and said control circuit is adapted for connection between said second terminal of said load circuit and said source of alternating current, said control circuit for periodically supplying a current path for unidirectional current flow through said load circuit which substantially corresponds to one-half of a cycle of the alternating current signal supplied by said source of alternating current, said control circuit comprising:
    clock means responsive to said alternating current signal for supplying a signal having a plurality of consecutive unidirectional signal pulses in substantial synchronism with successive alternate half cycles of said alternating current signal;

counter means responsive to said signal supplied by said clock means for supplying a pulse signal each time said clock means supplies a predetermined number of said unidirectional signal pulses, said counter means supplying said pulse signal in substantial synchronism with one of said unidirectional signal pulses of said signal supplied by said clock means;

electronic switching means having first, second and third electrodes for completing a unidirectional current path between said first and second electrodes each time a control signal is applied to said third electrode, said first and second electrodes of said electronic switching means being connected for completing a current path for coupling said unidirectional current through said load circuit when a control signal is supplied to said third electrode; and, trigger circuit means responsive to each of said pulse signals supplied by said counter means for supplying said control signal to said third electrode of said electronic switching means, said trigger circuit means including means for supplying said control signal substantially simultaneously with the initial signal transition of each of said pulse signals supplied by said counter means to complete said current path in substantial synchronism with the beginning of that alternate half cycle of said alternating current signal that causes said counter means to supply said pulse signal.

26. The control circuit of claim 25 wherein said clock means includes means for half-wave rectifying said alternate half cycles of said alternating current signal to supply said plurality of successive unidirectional signal pulses.

27. The control circuit of claim 26 further comprising power supply means responsive to said alternating current signal for supplying a reference potential and a predetermined operating potential to said counter means and said trigger circuit means.

28. The control circuit of claim 27 further comprising means for selectively establishing said predetermined number of unidirectional signal pulses required for said counter means to supply said pulse signal for activating said trigger circuit means.

29. The control circuit of claim 28 further comprising reset means for initializing said counter means each time said alternating current signal is applied to said power supply means to prevent said counter means from supplying said pulse signal to said trigger circuit means until said clock means has supplied said predetermined number of unidirectional signal pulses.

30. The control circuit of claim 27 wherein said clock means includes means for clamping said successive unidirectional signal pulses to said reference potential supplied by said power supply means.

31. Improved apparatus for maintaining an AC motor in a warm condition during time periods in which said motor is not in operation, said apparatus being of the type including an electronic switch that is connected between one terminal of a source of alternating current and one terminal of said motor that is electrically connected to a winding of said motor, said electronic switch having a control electrode and being responsive to a control signal that is supplied to said control electrode during a time interval in which the electrical signal supplied by said source of alternating current is of a predetermined polarity to induce unidirectional current flow through said electronic switch and at least one winding of said motor for the remaining portion of the half cycle interval in which said signal supplied by said source of alternating current is of said predetermined polarity, wherein the improvement comprises control means for selectively supplying said control signal to said control electrode of said electronic switch substantially at the beginning of a single half-cycle interval out of each group of n successive half-cycle intervals in which said electrical signal supplied by said source of alternating current is of said predetermined polarity, n being a selectable positive integer.

32. The improved apparatus of claim 31 wherein said control means includes:
clock means responsive to said signal supplied by said source of alternating current, said clock means for supplying a signal having n successive signal pulses in substantial synchronism with the half-cycles of each group of n successive half-cycles of said predetermined polarity that are supplied by said source of alternating current;
counter means responsive to said signal supplied by said clock means for supplying a single signal pulse each time said clock means supplies n signal pulses; and,
trigger means responsive to said signals supplied by said counter means for supplying said control signal to said control electrode of said electronic switch, said trigger means including means for supplying said control signal in substantial synchronism with each signal pulse supplied by said counter means to cause said unidirectional current flow through said electronic switch in said motor windings to substantially correspond to one-half cycle of said electrical signal supplied by said source of alternating current.

33. The improved apparatus of claim 32 wherein said improvement further comprises power supply means responsive to said electrical signal supplied by said source of alternating current for supplying said counter means and said trigger means with a predetermined operating potential.

34. The improved apparatus of claim 33 wherein said counter means supplies said single signal pulse in substantial synchronism with the last signal pulse of each group of n signal pulses supplied by said clock means and wherein said improvement further comprises reset means responsive to said predetermined operating potential supplied by said power supply means for supplying said counter means with a signal to initialize said counter means each time said electrical signal supplied by said source of alternating current is applied to said power supply means.

35. A motor heat control for an electric motor that is operated from a three-phase alternating current signal for supplying a unidirectional current to said motor corresponding to predetermined half-cycle signal intervals of a single phase of said three-phase alternating current wherein said motor is connected to said three-phase alternating current by means of three conductive paths that include contactor switches which are operable to cause said motor to cease operation and wherein a first conductive path of said three conductive paths remains established when said contactor switches are operated to cause said motor to cease operation, said motor heat control being connected in shunt circuit arrangement with the contactor switch included in the second conductive path of said three conductive paths to selectively and periodically establish a current path through said first and second conductive paths and at least one winding of said motor, said motor heat control comprising:
- clock means connected between said first and second conductive paths for receiving a single phase signal of said three-phase alternating current signal, said clock means including means for supplying a signal pulse in substantial synchronism with alternate half-cycles of said single phase signals;
- counter means for counting the number of signal pulses supplied by said clock means, said counter means including means for supplying a count pulse each time said clock means supplies a predetermined number of said signal pulses, said count pulse being supplied by said counter means in substantial synchronism with the beginning of that alternate half cycle of said single phase signal that results in the signal pulse supplied by said clock means which causes said counter means to supply said count pulse;
- controlled semiconductor means having an anode electrode, a cathode electrode and a gate electrode for completing said current path through said first and second conductive paths and said motor windings, said anode and cathode electrodes being connected to provide a shunt circuit path around said contactor switch of said second conductive path, said controlled semiconductor means establishing a unidirectional current path between said anode and cathode electrodes in response to a control signal supplied to said gate electrode; and,
- trigger circuit means responsive to each count pulse supplied by said counter means for supplying said control signal to said gate electrode of said controlled semiconductor means in substantial synchronism with each of said count pulses.

36. The motor heat control of claim 35 wherein each of said three conductive paths includes a contactor switch and said motor heat control further comprises an electrical conductor connected in shunt with the contactor switch of said first conductive path.

37. Improved apparatus for heating an electrical motor when said motor is shut-down, said apparatus being of the type including an electronic switch that is connected between one terminal of a source of alternating current and one terminal of said motor that is electrically connected to a winding of said motor, said electronic switch having a control electrode and being responsive to a control signal that is supplied to said control electrode during a time interval in which the electrical signal supplied by said source of alternating current is of a predetermined polarity to induce unidirectional current flow through said electronic switch and at least one winding of said motor for the remaining portion of the half-cycle in which said electrical signal supplied by said source of alternating current is of said predetermined polarity, wherein the improvement comprises:
- means for producing a plurality of output signals, each of said plurality of output signals being separated in time from a preceding one of said plurality of output signals by a predetermined interval greater than one cycle of the source of alternating current; and
- means responsive to said plurality of output signals and to said electrical signal supplied by said source of alternating current for providing said control signal to said control electrode of said electronic switch substantially at the beginning of a single half-cycle which follows the production of each of said plurality of output signals and in which said electrical signal supplied by said source of alternating current is of said predetermined polarity, said predetermined time interval being selected to effect a desired amount of heating in said motor.

38. An apparatus for heating an electrical motor when said motor is shut-down, said apparatus comprising first means for applying substantially an entire half-cycle of an electrical signal obtained from a source of alternating current to at least one winding of said motor, and second means for periodically enabling said first means at predetermined intervals which are selected to effect a desired amount of heating in said motor, each said predetermined interval being greater than one cycle of the source of alternating current.

* * * * *